United States Patent [19]

Briar

[11] 4,068,376
[45] Jan. 17, 1978

[54] FLEXIBLE CUTTING LINE AND ROTOR THEREFOR

[75] Inventor: Jack Briar, Gardner, Kans.

[73] Assignee: Allied Industries of Kansas, Inc., Gardner, Kans.

[21] Appl. No.: 735,834

[22] Filed: Oct. 26, 1976

[51] Int. Cl.² .......................................... B26B 27/00
[52] U.S. Cl. ........................................ 30/276; 56/12.7
[58] Field of Search ............... 30/276, 347; 56/12.7, 56/295; 15/198

[56] References Cited

U.S. PATENT DOCUMENTS

| 2,663,137 | 12/1953 | Asbury | 30/347 X |
| 3,104,510 | 9/1963 | Voigt | 30/347 X |
| 3,320,732 | 5/1967 | Kirk | 56/295 |
| 3,831,278 | 8/1974 | Voglesonger | 30/276 |

*Primary Examiner*—Jimmy C. Peters
*Attorney, Agent, or Firm*—Fishburn, Gold & Litman

[57] ABSTRACT

A rotor and cutting line for flexible-line vegetation cutters such as lawn trimmers, include a disc-shaped body having a central portion thereof connected with the drive shaft of the trimmer for bodily rotating the head. At least one entry and one exit opening are in the head with the exit opening positioned substantially radially through a peripheral portion of the body, and the openings are communicatively joined by an elongate passageway which extends within the body and has curvilinear or non-linear portion for engaging the cutting line. A flexible cutting line having a free end and another end portion having a portion larger than the entrance opening, is threaded through the openings and the elongate passageway, such that the enlarged end portion of the flexible line is disposed adjacent to and outwardly of the entrance opening, abuttingly engages the body and cooperates with the engagement of the line and passageway surfaces to removably secure the same within the rotor head. The free end of the flexible line extends outwarldy of the exit opening and is of a suitable length for cutting vegetation in response to rotor rotation.

10 Claims, 8 Drawing Figures

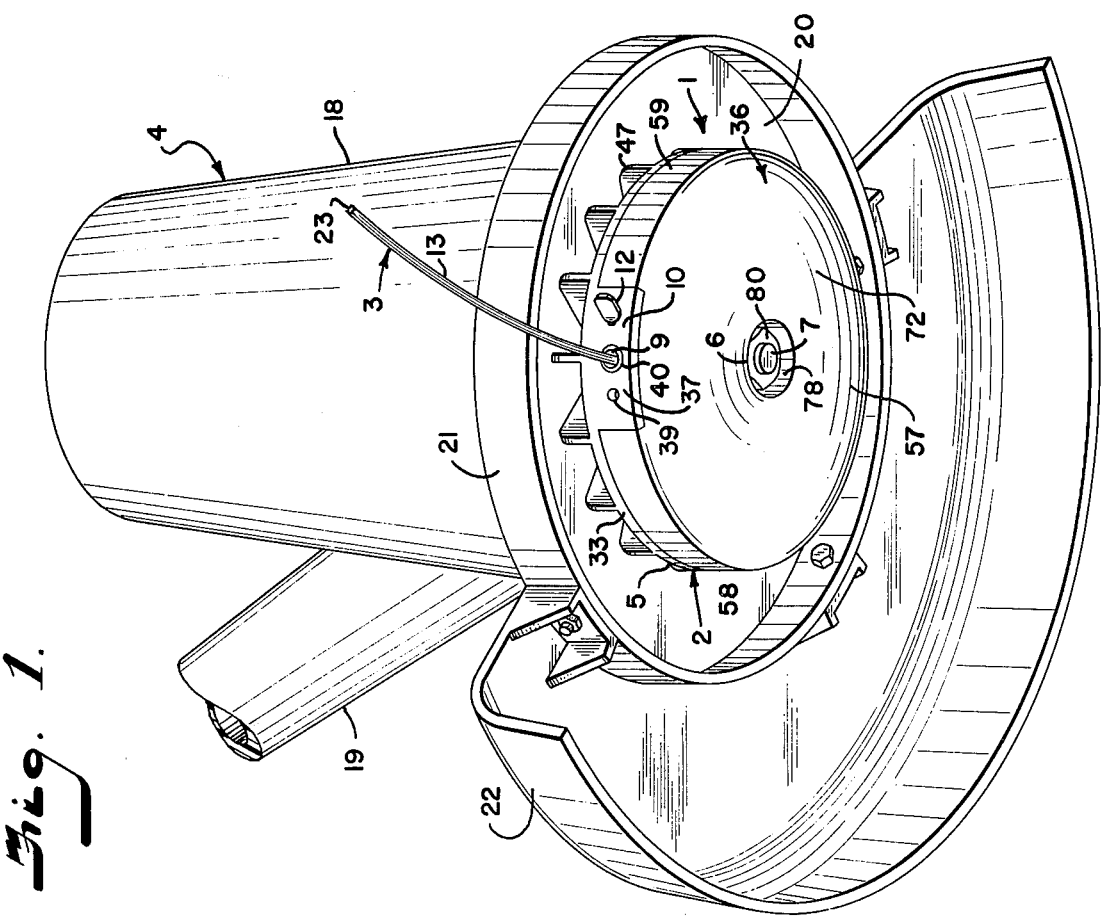

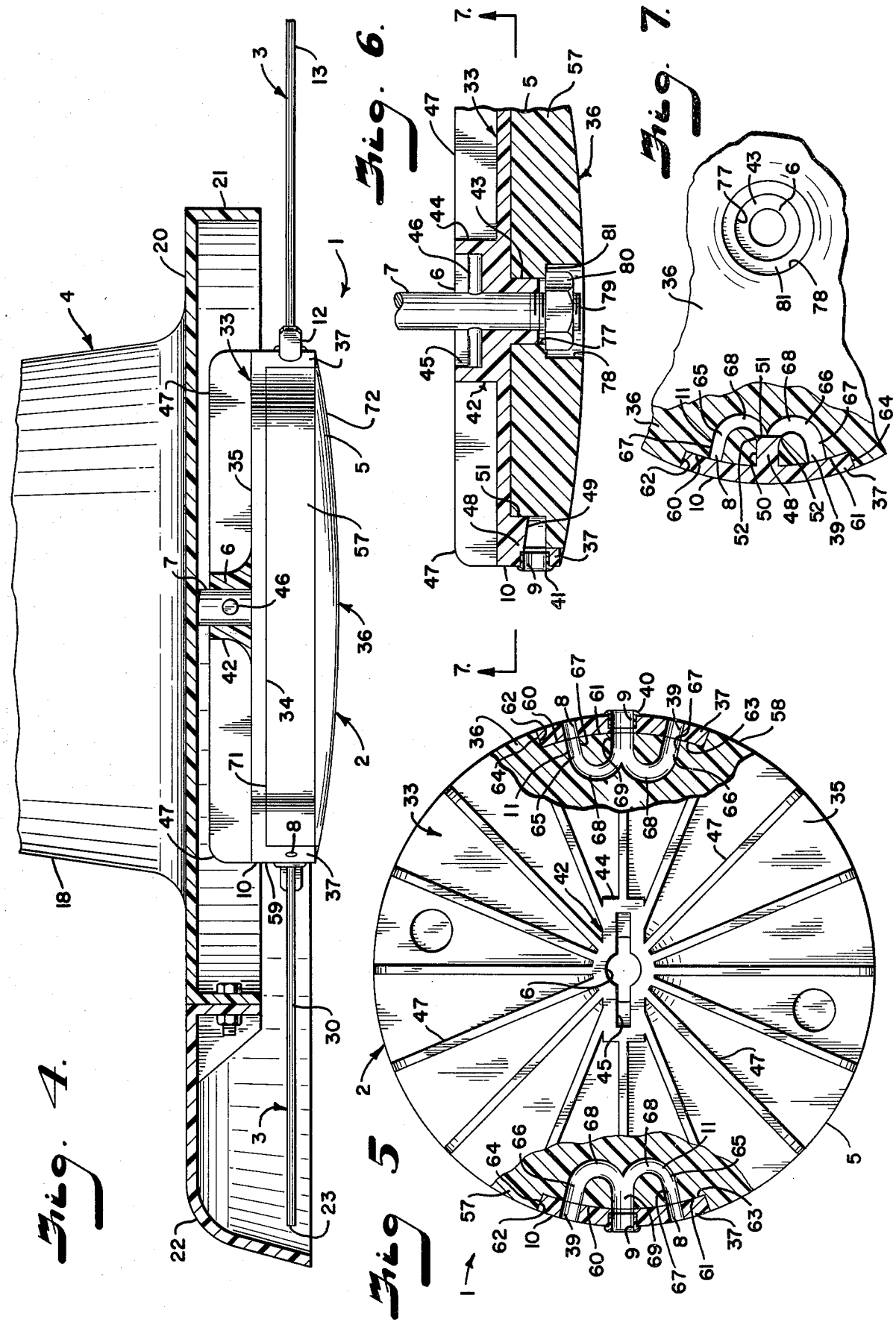

FLEXIBLE CUTTING LINE AND ROTOR THEREFOR

This invention relates to an apparatus for cutting vegetation and in particular to a motor and cutting line for flexible-line lawn trimmers.

Each of the lines of a flexible-line lawn trimmer is separable and adjustably connected with the rotor, to accomodate the replacement of frayed and worn-away end segments. Prior rotors generally include a spool portion on which several yards of the cutting line is stored, and from which the same is selectively payed when required. Such devices are difficult to manipulate and typically require substantial strength to unlock the spool from the rotor. The rotor during use, is exposed to substantial amounts of dirt, grass trimmings, and other such foreign materials which clog the line paying member and exacerbate the adjustment process. Further, the unwieldy handling and unpredictable functioning of these rotors often results in pulling a greater length of line from the spool than is necessary. Since trimmer operation in this condition causes the line to violently thrash against the housing, the user must cut the line to the proper length, which requires that he carry a cutting instrument for this purpose.

The principal objects of the present invention are: to provide a rotor and cutting line for flexible-line lawn trimmers wherein the cutting line can be quickly and easily replaced; to provide such a rotor wherein the line replacement mechanism comprises a peripheral, non-linear passageway through the body of the rotor, and a cooperating flexible cutting line positioned therein with an enlarged end separably anchoring the line in the rotor body; to provide such a rotor wherein the passageway is curved or angular whereby centrifugal forces act on the line to hold same in engagement with the surfaces of the passageway to hold the line in place; to provide such a rotor having a plurality of U-shaped apertures, each having a different diameter to accomodate various cutting line sizes; to provide such a rotor wherein the U-shaped apertures each include a common exit opening for ease of use, and economical manufacture; to provide such a rotor wherein the exit opening is enlarged and free of sharp edges for improved flexible-line operating life; to provide such a rotor wherein the body comprises a base portion separably connected with a hub portion for manufacturing ease and economy; to provide such a rotor wherein the lower, ground abutting surface thereof is arcuately shaped for operating ease; and to provide such a rotor which is economical to manufacture, efficient in use, capable of long operating life, and particularly well adapted for the proposed use.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

FIG. 1 is a bottom perspective view of a flexible-line lawn trimmer with a rotor and line embodying the present invention.

FIG. 2 is an enlarged perspective view of the flexible cutting line in a disengaged condition from the rotor.

FIG. 3 is a side elevational, exploded view of the rotor.

FIG. 4 is a side elevational view of the lawn trimmer with portions thereof broken away.

FIG. 5 is a top elevational view of the rotor with portions thereof broken away.

FIG. 6 is a fragmentary vertical cross-sectional view of the rotor head taken diametrically through an arcuate flange portion thereof.

FIG. 7 is a fragmentary plan view of the rotor base portion, taken on the line 7—7, FIG. 6, particularly showing the arcuate flange member.

FIG. 8 is a sectional view of a modified form of rotor and line passage with a line thereon.

Referring more in detail to the drawings:

As required, detailed embodiments of the present invention are disclosed herein, however, it is to be understood that the disclosed embodiments are merely exemplary of the invention which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a rotor head assembly embodying the present invention and comprising a rotor 2 and a flexible line 3 removably attached thereto and adapted for use with a motor driven flexible-line lawn trimmer 4. The rotor 2 comprises a disc-shaped body 5 having a central portion 6 thereof connected with the drive shaft 7 of the trimmer for bodily rotating the rotor 2. At least one entry and one exit opening 8 and 9 respectively, are provided and positioned radially through the peripheral portion 10 of the body. The openings 8 and 9 are communicatively joined by an elongate passageway 11 which extends within the body. The cutting line 3 is threaded through the openings and elongate passageway, and has one end portion 12 that engages the body in a position adjacent to the entrance opening 8 to removably secure the cutting line to the head, the line being of such length that it extends outwardly of the exit opening 9 for a desired length, providing a cutting portion 13 for cutting vegetation in response to rotation.

The lawn trimmer 4 includes a motor (not shown) which may be an electric or a gasoline engine in or mounted on a housing or support 18 through which the drive shaft 7 protrudes axially therefrom. An elongate handle 19 is connected with the motor housing 18, and extends upwardly therefrom to facilitate grasping and manipulation by the user. A base portion 20 of the housing, wherein the rotor head assembly 1 is mounted, includes a flange portion 21 under which the cutting line 3 extends outwardly to engage and cuts the vegetation. A shroud or cover member 22 is attached to the flange 21 and extends radially outwardly and downwardly therefrom to form a guard for the protection and safety of the user.

The illustrated cutting line 3 is an elongate structure having the one end 12 thereof enlarged and the cutting portion 13 with a free end 23, and is flexible for threading through the passageway 11. In the illustrated structure, the enlarged end 12 is formed by means such as heat molding, into a flat section 26 with the greatest width in the order of over two times the diameter of the line, and the forward edges 27 thereof are rounded and engage the body 5 adjacent to the entry opening 8, for removably anchoring the line within the rotor. The opposing side edges 28 are flat, and the end edge 29 is formed substantially perpendicularly thereto. In this example, the corners of end edge 29 are cut at an angle. The shank portion 30 of the line preferably has a generally cylindrical shape, and in the illustrated structure, includes a plurality of integrally attached and circumferentially spaced elongate ribs 31 which provide the line with a star-shaped cross section. The length of the cutting line 3 is determined in accordance with the specific application and the spacing of the shroud 22, whereby the full length of the line when rotated will not strike any portion of the flange 21 or shroud. The enlarged end 12 is lightweight in comparison to that portion of the line extending from the exit opening 9 to insure secure line anchoring during use.

The rotor 2 is preferably constructed of a base portion 33 having flat parallel surfaces 34 and 35 which are respectively downwardly and upwardly of the trimmer in its operational position, and a hub portion 36 which is separably connected therewith. The base portion 33 has a disc-shaped body and includes at least one flange segment 37 protruding downwardly from the outer peripheral portion 38 thereof on the surface 34. The flange segment 37 is arcuately shaped and has at least one entry opening 8 and one exit opening 9 disposed radially therethrough. In the illustrated structure, the rotor head includes two flange segments 37 positioned on diametrically opposed sides of the base portion 33. Each of the flange segments 37 includes first and second entry openings 8 and 39 respectively, and a single exit opening 9, positioned between and adjacent to said entry openings. The first and second entry openings each have a diameter of differing measure to accomodate the insertion therethrough of variously sized cutting lines. The exit opening 9 has a diameter with a measure greater than that of either entry opening and is free of sharp edges for improved cutting line wear. In this example, an eyelet 40 having a smooth and rounded outer edge 41, is disposed within the exit opening 9 and is attached to the flange segment 37 by means such as adhesive, riveting, threads, or the like. A sleeve member 42 of the base portion 33 is integrally attached thereto and comprises a pilot portion 43 extending from the downward surface 34 of the base, and a shaft retaining portion 44 extending from the upward surface 35 of the base. The pilot portion 43 of the sleeve is cylindrically shaped and includes a smooth outer surface adapted for centering the hub 36 over the base 33. The retainer portion 44 includes a slotted, rectangularly shaped segment 45 which is shaped to receive a key or pin 46 therein for transmitting rotational motion from the drive shaft 7 to the rotor 2. In this example, a plurality of radially oriented and circumferentially spaced ribs 47 are connected with and depend from the upward surface 35 of the base 33 and form a fan which circulates air axially through the lawn trimmer motor for cooling the same. A protuberance 48 is upstanding from the downward surface 34 of the base 33 and extends from the flange segment 37 at a point adjacent to the exit opening 9, radially inwardly to form a key for preventing relative rotational movement between the base and hub members 33 and 36 respectively. The upper edge 49 of the protuberance 48 is inclined upwardly toward the center of the head, the sides 50 are flat and parallel toward the outward end, and the inwardly end 51 is enlarged with an arcuately shaped portion 52. The rotor is preferably constructed of a synthetic resin material such as polyethylene, polypropolene, or the like.

The hub portion 36 includes a disc-shaped body 57 having an outer peripheral edge 58 coplanar with the outer peripheral edge 59 of the base 33. At least one slot 60 is positioned in the peripheral edge portion 58 of the hub wherein the flange segment 37 of the base portion 33 cooperates and mates therewith. The slot 60 is defined by an arcuately shaped inwardly surface 61 and a pair of relatively shallow, radially oriented end walls 62 which are shaped to cooperate with the corresponding portions 63 and 64 respectively, of the flange segment 37. At least one elongate passageway 11 having a curvilinear shape is positioned within the hub and communicatively joins the entry and exit openings 8 and 9 respectively. In the illustrated structure, two sets of elongated passageways are provided on diametrically opposed sides of the hub portion 36 and correspond with the similarly positioned flange segments 37. Each of the passageway sets includes a first and a second portion 65 and 66 respectively, each having a circular cross-sectional shape for receiving therein the flexible cutting line 3. In the illustrated hub, the passageway portions 65 and 66 have a U-shaped cross-sectional shape, and extend longitudinally in a curvilinear fashion, and include a short, straight segment 67, a semi-circular segment 68, and a common exit segment 69. The exit segment 69 is positioned concentrically of the exit opening 9, and the entry portions 67 are disposed concentrically of one of the respective entry openings 8. The open ends 70 of the channels are coextensive with the inward surface 71 of the hub 36, and can be molded into the same or cut therefrom by means such as routing. The width of each entry segment 67 is formed in correspondence with the diameter of the various entry openings, and the width of the common exit segment 69 of the two passageways is selected in accordance with the enlarged diameter of the exit opening. The outward surface 72 of the rotor hub is domed or arcuately shaped to facilitate smooth engagement with the ground and/or base vegetation. The central portion 6 of the hub 36 includes an aperture 77 with an enlarged or counterbored portion 78. The aperture portion 77 is positioned telescopically over the base pilot 43 and centers the base and hub members. The trimmer drive shaft 7 extends through the sleeve 42, and the threaded end 79 thereof is disposed within the enlarged area 78 of the hub. The drive shaft 7 includes a transverse aperture therethrough with the pin 46 mounted therein which engages the walls and bottom of the rectangular slotted segment 45. A nut 80 is connected with the threaded end 79 of the motor shaft and engages a shoulder portion 81 of the hub, and retains the hub and base members in an engaged condition. The protuberance or key 48 engages the side walls defining the exit segment 69 and prevents relative rotational motion between the hub and base members.

The user is supplied with a plurality of cutting lines 3, which can be easily and conveniently transported about the area to be trimmed on the user's person.

The user installs one of the cutting lines in the lawn trimmer apparatus by inserting the free end 23 of the flexible line into the entry opening 8, and pushing the same through the elongated passageway 11 until it projects from the exit opening 9. The curvilinear shape of the passageway portions 65 and 66 facilitates this insertion process. The user then grasps the free end of the cutting line and threadingly pulls the line therefrom until the enlarged end thereof engages that portion of the body disposed adjacent to the entry opening. The centrifugal forces acting on the rotating cutting line firmly hold the enlarged end 12 in contact with the body and anchors the same therein during use. When the cutting line is worn and/or broken and requires replacement, the user simply grasps the enlarged end of the flexible cutting line and pulls the same along with the remaining portion thereof from the body. A new line is inserted into the lawn trimmer in the manner previously described.

The form of the invention illustrated in FIG. 8 is for the same purpose, and uses the same lines as used in the structures shown in FIGS. 1 to 7 inclusive. The difference is in the location of the entry to the line passages for extension of the line from the periphery of the rotor body 85. In the structure illustrated, the exit passage portions 86 to the peripheral exit 87 is substantially radial. The entry passage portion 88 extends from the entry opening 89 to an intersection as at 90 with the passage portion 86. The angular relation is preferably generally in the nature of 120°, or the like, for ease of moving the line through the passages for positioning same for cutting operations.

In the structure illustrated the entry opening is at an end surface 91 of the body with the entry passage portion 88 extending therefrom outwardly of the axis and to an intersection as at 92 with a substantially radial outlet passage portion 86 whereby the line extends outwardly of the body periphery providing the cutting portion of the line.

The use of the modified form is substantially the same as the form shown in FIGS. 1 to 7, including with the enlarged end engaging the body to limit outward movement of the line and making it easy to remove the line if broken in use. In this structure the entry passage and exit passage are in the same plane and in an angular or curved relationship, whereby the centrifugal force acting on the cutting line extending from the body periphery pulls on the same so that the force draws the enlarged end against the surface around the entry opening and pulls the line against the angular or curved passages to provide a holding force that reduces the pulling force on the enlarged end for long life. If the cutting end of the line is broken or frayed to the extent replacement is required, the line is easily removed by pulling outwardly on the enlarged or abutment end thereof.

It is to be understood that while I have illustrated and described certain forms of my invention, it is not to be limited to the specific forms or arrangement of parts herein described and shown.

What I claim and desire to secure by Letters Patent is:

1. In combination, a rotor and a cutting line for a flexible-line lawn trimmer having a drive shaft, said combination comprising:
   a. a body having a peripheral portion and an axial central portion;
   b. means for connecting the central portion of said body with the drive shaft of said lawn trimmer whereby said rotor body is bodily rotated;
   c. a first entry opening and a first exit opening; said exit opening being positioned substantially radially through the peripheral portion of said body;
   d. means communicatively joining said first entry and first exit openings with an angular relationship therebetween;
   e. a first flexible cutting line threaded through said first entry and exit openings and having an enlarged end and a free end; said enlarged end being adjacent to and outwardly of said first entry opening, abuttingly engaging said body, and separably anchoring said first flexible cutting line in said body; said free end extending outwardly of said first exit opening and being of suitable length for cutting vegetation in response to rotor rotation;
   f. said means communicatively joining said first entry and exit openings comprises a first elongate passageway within said body;
   g. said first flexible cutting line is disposed within said first passageway;
   h. said entry and exit openings are positioned apart and at an angular relationship;
   i. said first elongate passageway has a curvilinear shape;
   j. said entry and exit openings each has a circular cross-sectional shape and a diameter; and
   k. the diameter of said exit opening is larger than the diameter of said entry opening for improved line wear.

2. A rotor and cutting line as set forth in claim 1 including:
   a. an eyelet disposed concentrically in said exit opening and connected with said body; said eyelet having a smooth and rounded peripheral edge for improved line wear.

3. A rotor and cutting line as set forth in claim 1 wherein:
   a. said enlarged end of the cutting line is integral and one-piece with said line, and has a formed flat portion with substantially parallel sides, and a width substantially larger than the size of the entry opening.

4. A rotor and cutting line as set forth in claim 1 including:
   a. a second entry opening positioned radially through the peripheral portion of said body;
   b. a second elongate passageway disposed within said body, having a curvilinear shape, and communicatingly joining said second entry and first exit openings; and
   c. said first and second entry openings each having a diameter; the diameter of said first entry opening being larger than the diameter of said second entry opening for accomodating variously sized flexible cutting lines.

5. A rotor and cutting line as set forth in claim 4 wherein:
   a. said first and second entry openings are positioned adjacent to and on opposite sides of said first exit opening.

6. A rotor and cutting line as set forth in claim 5 including:
   a. a second exit opening positioned radially through the peripheral portion of said body and diametrically opposed from said first exit opening;
   b. third and fourth entry openings disposed radially through said peripheral portions and being adjacent to and on opposite sides of said second exit opening;
   c. third and fourth elongate passageways disposed within said body, each having a curvilinear shape, and communicatingly joining said third and fourth entry openings respectively with said second exit opening; and
   d. a second flexible cutting line disposed within one of said third and fourth elongate apertures, and having an enlarged end for anchoring said second cutting line and a free end of a length for cutting vegetation in response to rotor rotation.

7. In combination, a rotor and a cutting line for a flexible-line lawn trimmer having a drive shaft, said combination comprising:
  a. a body having a peripheral portion and an axial central portion;
  b. means for connecting the central portion of said body with the drive shaft of said lawn trimmer whereby said rotor body is bodily rotated;
  c. a first entry opening and a first exit opening; said exit opening being positioned substantially radially through the peripheral portion of said body;
  d. means communicatively joining said first entry and first exit openings with an angular relationship therebetween;
  e. a first flexible cutting line threaded through said first entry and exit openings and having an enlarged end and a free end; said enlarged end being adjacent to and outwardly of said first entry opening, abuttingly engaging said body, and separably anchoring said first flexible cutting line in said body; said free end extending outwardly of said first exit opening and being of suitable length for cutting vegetation in response to rotor rotation;
  f. said means communicatively joining said first entry and exit openings comprises a first elongate passageway within said body;
  g. said first flexible cutting line is disposed within said first passageway;
  h. said entry and exit openings are positioned apart and at an angular relationship;
  i. said first elongate passageway has a curvilinear shape;
  j. said body comprises a base portion separably connected with a hub portion;
  k. said base has a disc shape and includes at least one flange segment projecting from an outer peripheral surface of said base; said first entry and exit openings being positioned radially through said flange segment;
  l. said hub has a disc shape and cooperatingly engages said base, and includes a slot in a peripheral edge portion thereof wherein said flange portion is positioned and mates therewith, said first elongate passageway being positioned within said hub and having a channel shape with an open end thereof being coextensive with an inwardlymost surface of the hub; and
  m. means separably interconnecting said base with said hub.

8. A rotor and cutting line as set forth in claim 7 wherein:
  a. said hub includes an arcuately shaped outermost surface; and
  b. said hub and base each include a central aperture through which said motor shaft is disposed; said motor shaft having retaining means disposed on the free end thereof for holding said hub and base together.

9. A rotor and cutting line as set forth in claim 8 wherein:
  a. said base includes a sleeve portion positioned centrally therein and extending from both sides of said base;
  b. said sleeve having an outer portion with a cylindrical shape, being disposed telescopically within said hub central aperture and centering said hub and base; and
  c. said sleeve having an inner portion wherein said motor shaft is keyed for bodily rotating said rotor.

10. In combination, a rotor and a cutting line for a flexible-line lawn trimmer having a drive shaft, said combination comprising:
  a. a body having a peripheral portion and an axial central portion;
  b. means for connecting the central portion of said body with the drive shaft of said lawn trimmer whereby said rotor body is bodily rotated;
  c. an entry opening and an exit opening; said exit opening being positioned generally radially through the peripheral portion of said body;
  d. means communicatively joining said entry and exit openings with an angular relationship therebetween;
  e. a flexible cutting line threaded through said entry and exit openings and having an enlarged end and a free end; said enlarged end being adjacent to and outwardly of said entry opening, abuttingly engaging said body, and separably anchoring said flexible cutting line in said body; said free end extending outwardly of said exit opening and being of suitable length for cutting vegetation in response to rotor rotation;
  f. said entry and exit openings are positioned apart and at an angular relationship;
  g. said means communicatively joining said entry and exit openings comprises an elongate passageway within said body, said elongate passageway having an entry portion and an exit portion extending into said body from the entry and exit openings respectively and a curved portion connecting said entry portion and exit portion of said elongate passageway and permitting a cutting line free end to be inserted into said entry opening and move through said elongate passageway and out the exit opening to extend therefrom with the enlarged end abutting said body at the inlet opening.

* * * * *